United States Patent
Engstrom

(10) Patent No.: US 6,941,346 B2
(45) Date of Patent: Sep. 6, 2005

(54) EMAIL—EXPANDED ADDRESSEE SORT/LISTING

(75) Inventor: G. Eric Engstrom, Kirkland, WA (US)

(73) Assignee: Hall Aluminum LLC, Los Altos, CA (US)

(*) Notice: Subject to any disclaimer, the term of this patent is extended or adjusted under 35 U.S.C. 154(b) by 791 days.

(21) Appl. No.: 09/796,767

(22) Filed: Feb. 28, 2001

(65) Prior Publication Data

US 2002/0120695 A1 Aug. 29, 2002

(51) Int. Cl.⁷ .............................................. G06F 15/16
(52) U.S. Cl. ........................ 709/206; 709/207; 379/93.24
(58) Field of Search .................................. 709/206, 207; 379/93.01, 93.24; 345/169, 751, 752, 738–739, 825

(56) References Cited

U.S. PATENT DOCUMENTS

| | | | | |
|---|---|---|---|---|
| 5,694,616 A | * | 12/1997 | Johnson et al. | 709/207 |
| 6,192,118 B1 | * | 2/2001 | Bayless et al. | 379/201.01 |
| 6,385,655 B1 | * | 5/2002 | Smith et al. | 709/232 |
| 6,438,584 B1 | * | 8/2002 | Powers | 709/206 |
| 6,553,425 B1 | * | 4/2003 | Shah et al. | 709/245 |
| 2001/0018698 A1 | * | 8/2001 | Uchino et al. | 707/533 |
| 2002/0073117 A1 | * | 6/2002 | Newman | 707/513 |

OTHER PUBLICATIONS emm manual, http://cnswww.cns.cwru.edu/~chet/info/emm.man.html, Feb. 2, 1999, pp. 1–10.*

* cited by examiner

Primary Examiner—Frantz B. Jean
(74) Attorney, Agent, or Firm—Schwabe, Williamson & Wyatt, P.C.

(57) ABSTRACT

An enhanced email program/service is provided to facilitate provisioning for a user an expanded addressee ordered listing of emails including expanded listing entries for emails addressed to one or more addressees of interest as secondary and/or member addressees, in addition to listing entries where the one or more addressees of interest are addressed as primary addressees. In various embodiments, the enhancements include facilities that enable the user to easily request for the expanded listing, from an addressee ordered or non-addressee ordered listing of emails, with or without explicitly specifying the addressee or addressees of interest. In response, the email program/service provisions the expanded listing, including the re-ordering if necessary, accordingly. As a result, the user may easily obtain a listing of all emails addressed to one or more addressees of interest, independent of the position and/or manner the addressees of interest are addressed.

37 Claims, 15 Drawing Sheets

EMAIL— EXPANDED ADDRESSEE SORT/LISTING

BACKGROUND OF THE INVENTION

1. Field of the Invention

The present invention relates to the field of data processing. More specifically, the present invention relates to the functions of email programs/services associated with facilitating user viewing and processing of their emails.

2. Background Information

With advances in integrated circuit, microprocessor, networking and communication technologies, increasing number of devices, in particular, digital computing devices, are being interconnected together. The increased interconnectivity of computing devices have led to wide spread adoption of applications "connecting" a large number of users/organizations together, such as the world wide web and email.

To many users, email, whether it is provided through a program (such as Lotus Notes, available from IBM of Armonk, N.Y.) or a service (such as Hotmail, available from Microsoft Network of Redmond, Wash.), has become a fundamental medium of communication just like telephone. Even for the moderate reliant users, it is not unusual to have hundreds if not thousands of emails accumulated in their "inboxes", "sent folders" or other subject specific "folders". [As those skilled in the art would appreciate, "inboxes", "folders" in general and "sent folders" in particular are typically logical views of the email records being held, i.e. undeleted.]

Prior art email programs/services typically offer only standard sorting functions 116a–116b that sort email listings within a folder (e.g. sent folder 106) in either ascending or descending order in accordance with the content of one of the listing fields, such as "To" field 108 (also referred to as "addressee" field) or "Date Sent" field 112, as illustrated in FIGS. 1a–1b. If the sort field is the "addressee" field, the sorting and therefore, the resulted listing 114 is based on the primary addressee (i.e. the first enumerated addressee in accordance with the spatial order of enumeration), as illustrated in FIG. 1b. Other addressees, referred to as secondary addressee, i.e. subsequent (or non first) enumerated addressees (in accordance with the spatial order of enumeration), or implied addressees (as in the case of group addressees) are not taken into consideration. A group addressee is an addressee that implicitly addresses multiple recipients (often referred to as member addressees of the group addressees) at the same time, such as example addressee "dept99" shown in FIG. 1a. For the example group address "dept99", it implicitly addresses all members of Department 99 at the same time. Typically, group addressees are set up by "users" having the requisite "administration" authority, such as an email system's administrator.

Thus, for a user with a relatively large number of accumulated emails (in a "folder"), it is rather difficult under the prior art to find all the emails addressed to an addressee of interest (within the "folder"), as the addressee of interest is not always addressed as the primary addressee. The addressee of interest may be addressed as a secondary addressee or indirectly via a group addressee.

While some email programs/services offer a "find" or "advanced find" function to allow a user to find emails based on certain contents in certain fields, many users consider these "find" or "advanced find" functions difficult to use. Moreover, it can only locate the other email listings where an addressee of interest is addressed as a primary or secondary addressee. These "find" or "advanced find" functions are unable to identify for a user, emails addressed to certain group addressees where the addressee of interest is a member of these group addressees.

Thus, a more user friendly approach to allowing a user to locate emails addressed to an addressee of interest, independent of the addressing position and/or the addressing manner, is desired.

SUMMARY OF THE INVENTION

An enhanced email program/service is provided to facilitate provisioning for a user an expanded listing of emails including expanded listing entries for emails that address one or more addressees of interest as secondary and/or member addressees, in addition to listing entries for emails where the one or more addressees of interest are addressed as primary addressees. In various embodiments, the enhancements include facilities that enable the user to easily request for the expanded listing, from an addressee or non-addressee ordered listing, with or without explicitly specifying the addressee or addressees of interest. In response, the email program/service provisions the expanded listing accordingly, including re-ordering the listing in ascending/descending order of the addressees, if necessary. As a result, the user may easily obtain a listing of all emails addressed to one or more addressees of interest, independent of the position and/or the manner the addressees of interest are addressed.

In one embodiment, the enhancements include facilities that enable a user to select an addressee of interest among the listed primary addressees from an addressee ordered listing, and request for the expanded listing for the selected addressee of interest. In another embodiment, the enhancements include facilities that enable a user to select an addressee of interest among the listed primary addressees from a listing ordered by one or more non-addressee based criteria, and request re-ordering by addressee and expansion for the selected addressee of interest at the same time. In yet another embodiment, the enhancements include facilities that enable a user to simply request expansion for all primary addressees, including re-ordering by addressee, if necessary.

In various embodiments, the email program/service is implemented by way of a client/server architecture. In one embodiment, the enhancements are made to the client, in another, to the server, and in yet another, distributively to both the client and the server.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, tables, requesting, selecting, supplementing, displaying, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

First Embodiment

Figure 1A:
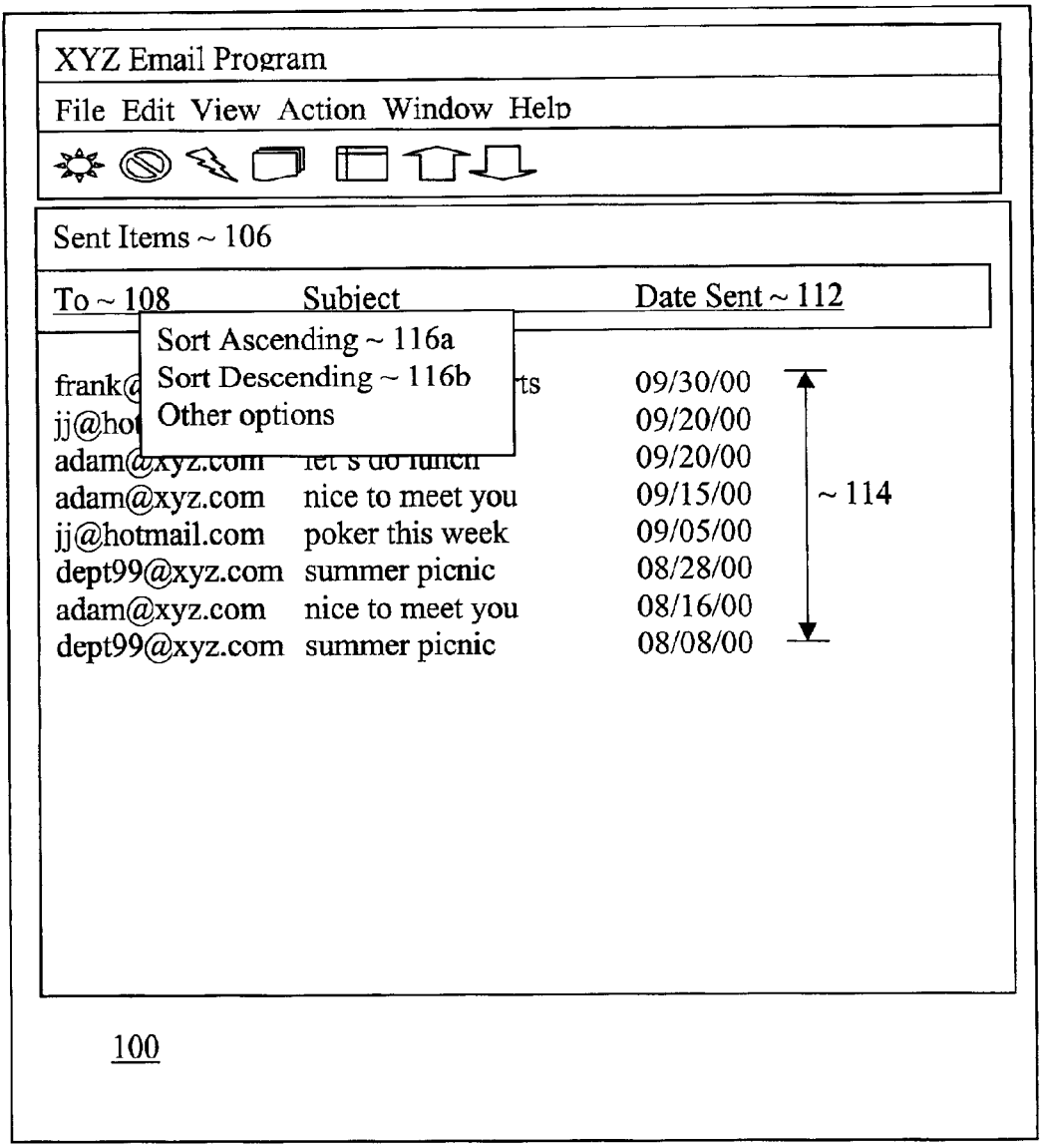
FIGS. 1a–1b illustrate an user interface view of exemplary addressee sort/listing functions of prior art email programs/services.
Figure 1B:
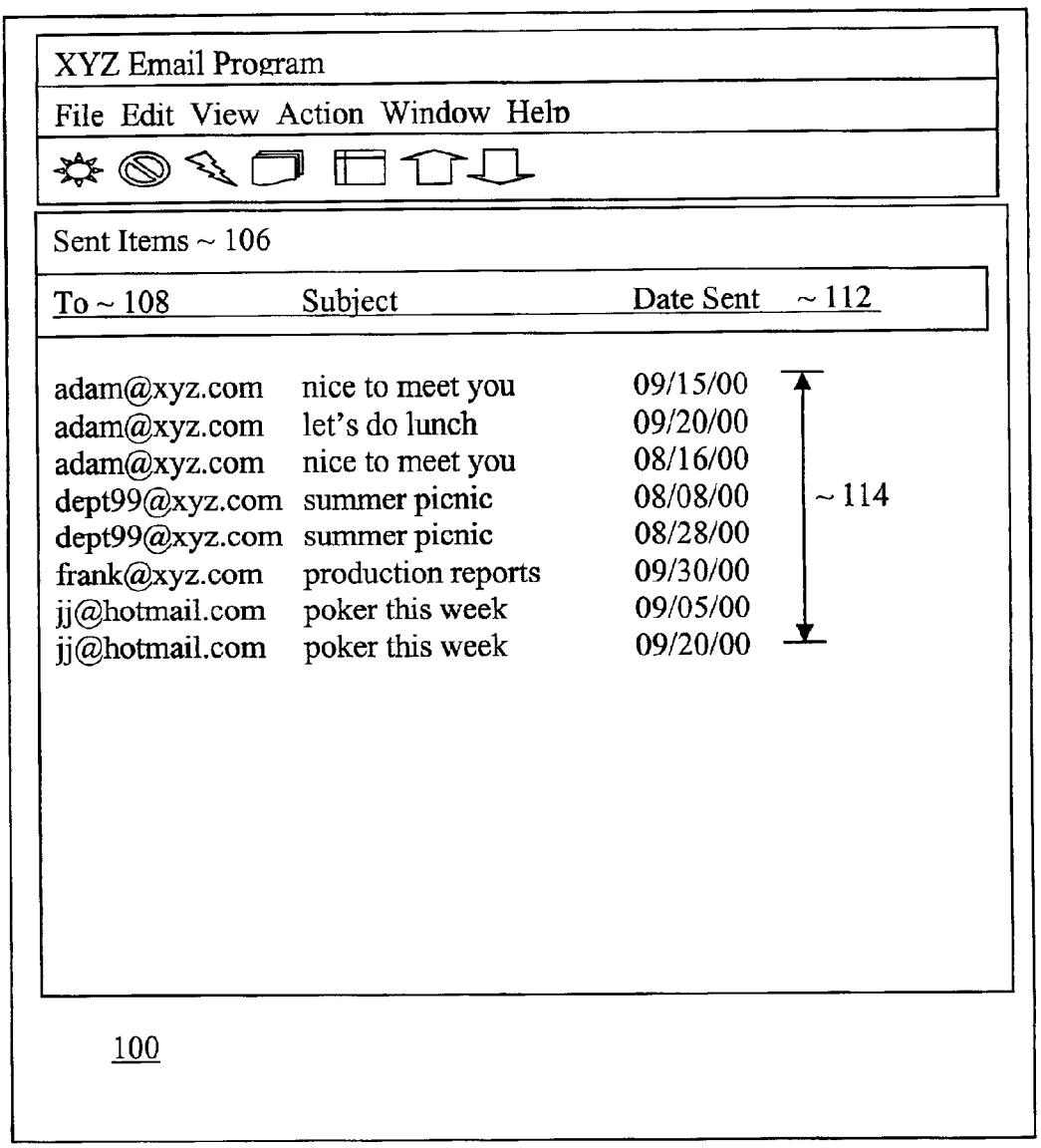
Figure 2A:
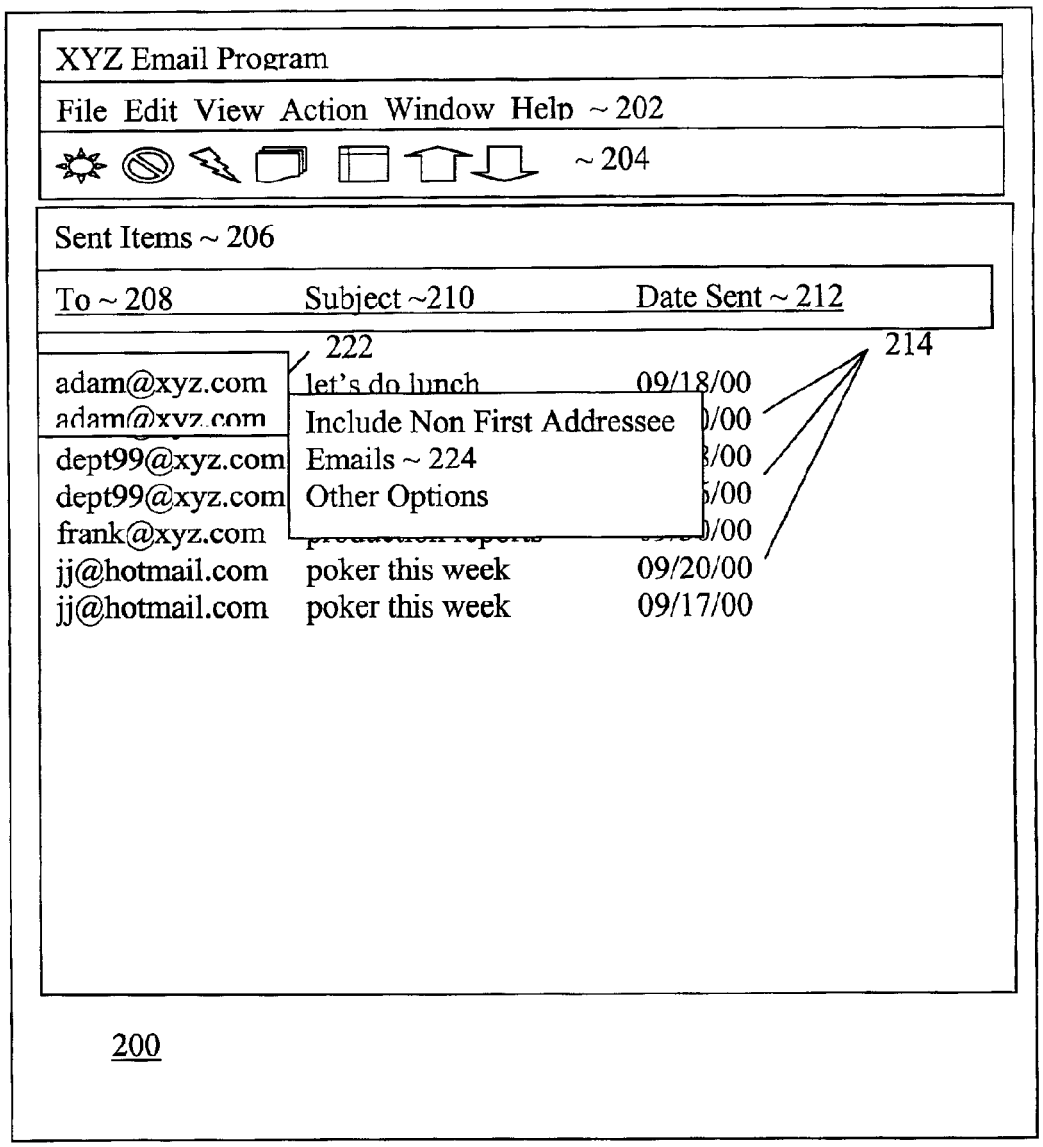
FIGS. 2a–2b illustrate an user interface view of the expanded addressee sort/listing function of the present invention, in accordance with one embodiment.
Figure 2B:
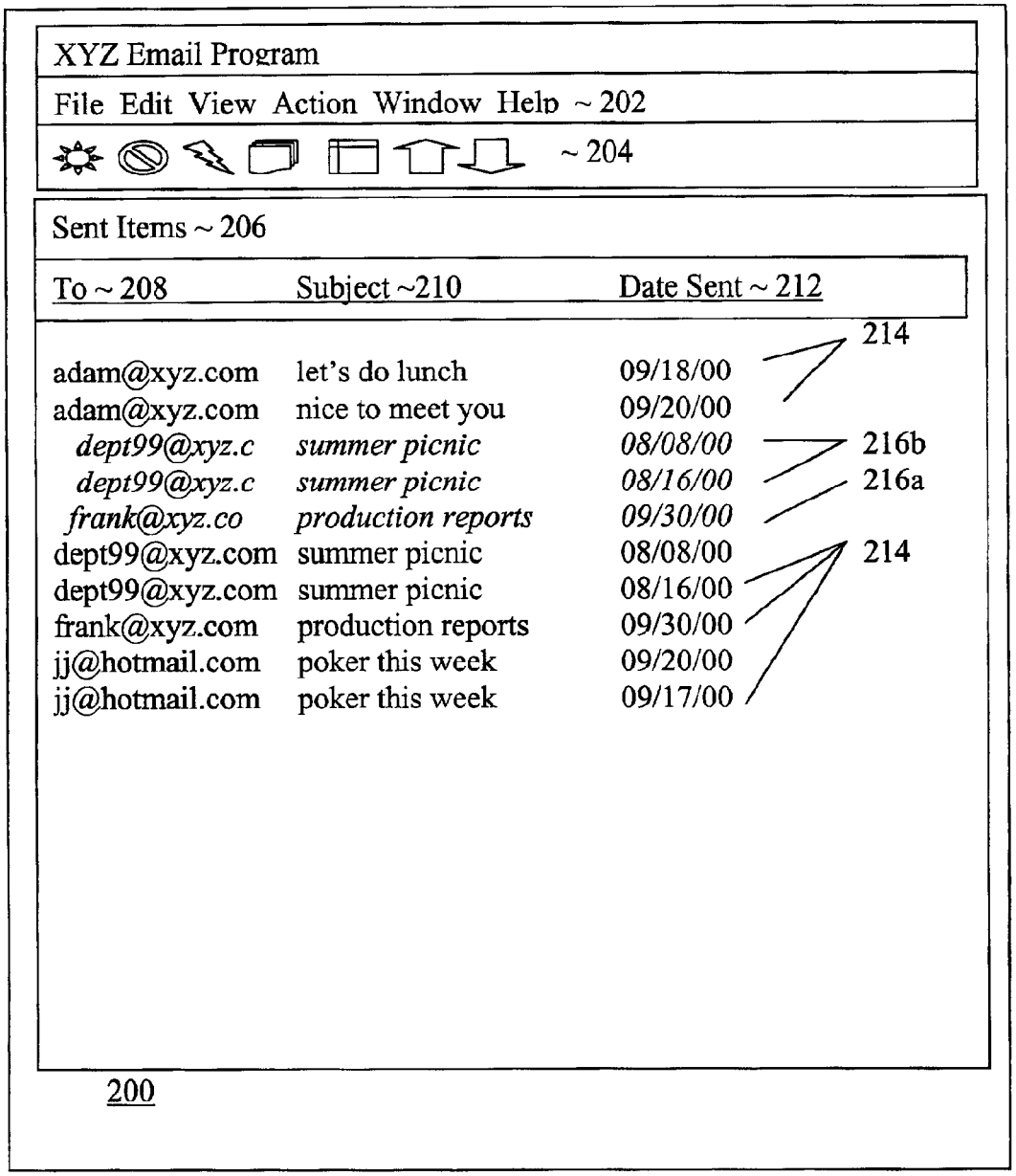

Referring now to FIGS. 2a–2b, wherein two block diagrams illustrating an end user interface view of the expanded addressee sort/listing function of the enhanced email program/service of the present invention, in accordance with one embodiment, are shown. Under this embodiment, a user may easily request an addressee ordered listing of emails be expanded for a selected addressee of interest (among the listed primary addressees), supplementing the addressee ordered listing (which conventionally includes listing entries for emails where the selected addressee of interest is addressed as the primary addressee) with listing entries for emails where the selected addressee of interest is also addressed as a secondary or member addressee.

As illustrated in FIG. 2a, example end user interface 200 of the enhanced email program/service of the present invention includes menu 202 of "drop down" commands, i.e. "File", "Edit" and so forth, and menu 204 of action icons. Further, example end user interface 200 includes sent item view 206 (i.e. a "folder content" view of the sent emails) having "To" column 208, "Subject" column 210, and "Date Sent" column 212, listing sent emails 214. For the example illustration, the emails are ordered in an ascending manner based on the content of the addressee field, i.e. "To" column 208, which means sent emails 214 are ordered by their primary addressees. As will be readily apparent from the description to follow, the present invention may also be practiced with emails ordered in a descending manner.

In accordance with this embodiment of the present invention, the enhanced email program/service further includes enhancements that facilitate a user in selecting an addressee of interest among the listed primary addressees (e.g. adam "at" xyz.com 222) of the addressee ordered listing of emails 214 displayed, and request 224 the addressee ordered listing of emails be expanded for the selected addressee of interest. More specifically, the enhanced email program/service includes enhancements that facilitate a user in requesting the addressee ordered listing of emails 214 (for the addressee of interest selected among the listed primary addressees) be supplemented with listing entries for emails where the selected addressee of interest is also addressed as a secondary or member addressee.

In preferred ones of the various embodiments, expansion of group addressees to determine whether the selected addressee of interest is implicitly addressed for being a member addressee of a specified group addressee is performed only if such "group addressee expansion" option is selected among the various options available for selection in the user's profile. The selection may be facilitated as other prior art user options. For ease of understanding, the remaining description will assume the user has selected this "group addressee expansion" option in his/her user profile.

As illustrated in FIG. 2b, in response to the request to expand the ordered listing for the selected addressee of interest (among the listed primary addressees), the enhanced email program/service of the present invention expands the listing entries of emails 214 accordingly. The conventional listing entries 214 for the selected addressee of interest, e.g. "adam", are supplemented with listing entries of emails where the selected addressee of interest is a secondary addressee (e.g. listing entry 216a), or a member addressee (e.g. listing entries 216b). In this example, "adam" is a member addressee of group addressee "dept99" by virtue of its inclusion among the member addressees of group address "dept99" when an "administrator" created or subsequently updated the group address.

Listing entry 216a represents an added listing entry for an email addressed to another party ("frank") as the primary addressee, with "adam", the addressee of interest (selected among the listed primary addressees) addressed as a secondary addressee. Listing entries 216b represent added listing entries for emails addressed to a group addressee ("dept99") as the primary addressee, with "adam", the addressee of interest (selected among the listed primary addressees) implicitly addressed as a member addressee.

In one embodiment, selection of an addressee of interest among the primary addressees of listing entries 214 is facilitated by supporting a user in clicking on a primary addressee of one of the displayed listing entries 214, using e.g. a cursor control device. The request to expand the listing entries of the addressee of interest (selected among the listed primary addressees) is facilitated by displaying the request, e.g. "Include" request (224, FIG. 2*a*), among a list of request/command options, in response to a user "right clicking", after having selected the addressee of interest (among the listed primary addressees), using e.g. a cursor control device. Such facilitation is known in the art, and will not be further described.

Further, the supplemental listing entries are inserted directly below the supplemented listing entries of the addressee of interest. Additionally, the supplemental listing entries are visually distinguished by such techniques as indentation, italicizing, and so forth.

Thus, it can be seen, the expanded listing supplemented with listing entries identifying emails where the addressee of interest (selected among the listed primary addressees of interest) is also addressed as a secondary or a member addressee, may be easily provided for the user, through a few mouse clicks (or equivalent key strokes). Accordingly, under the present invention, it is much easier (as compared to the prior art) for a user to locate or identify an email addressed to an addressee of interest, independent of the addressing position or the manner the addressee of interest is addressed, as all emails addressed to the addressee of interest (within the "current" view, such as illustrated "sent" view 206' of FIGS. 4*a*–4*b*) may be quickly listed for the user.

Figure 3:
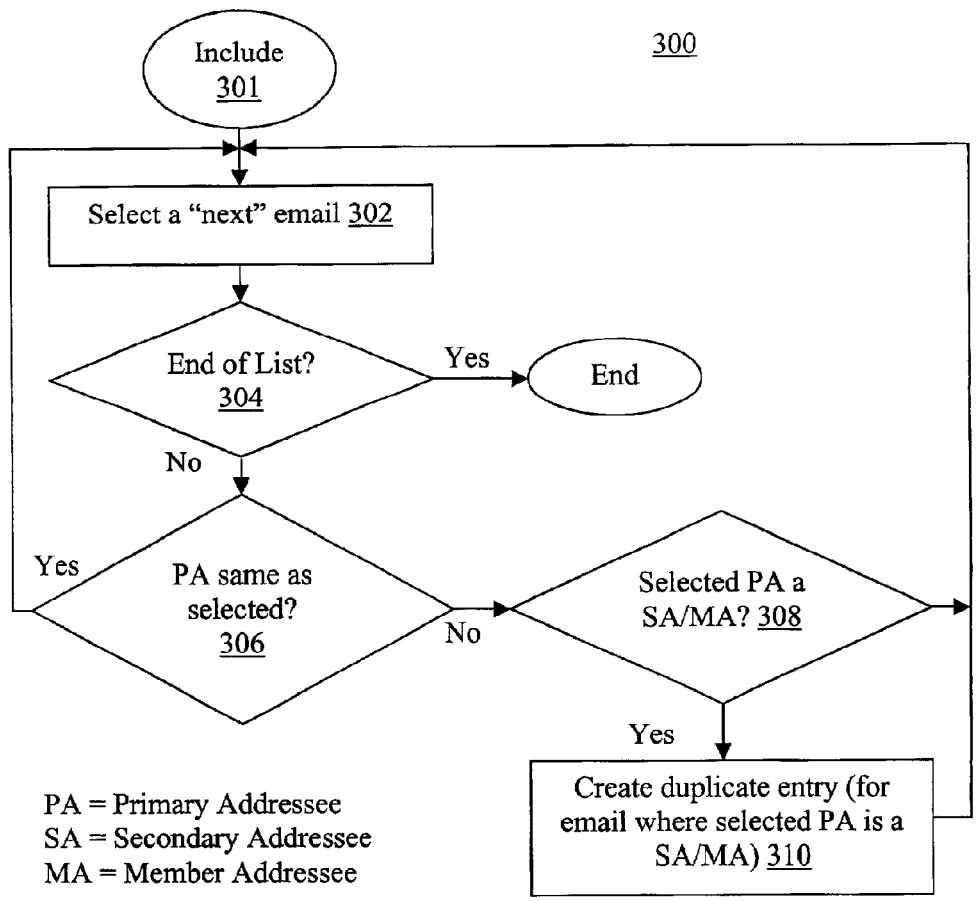
FIG. 3 illustrates the operational flow of the relevant aspects of the enhanced email program/service of the present invention of the embodiment of FIGS. 2a–2b.

FIG. 3 illustrates operational flow 300 of the relevant aspects of the enhancements made to the email program/service of the present invention for the embodiment of FIGS. 2*a*–2*b*. As illustrated, in response to the receipt of a request 301 to supplement the email listing entries of an addressee of interest (selected among listed primary addressees of an addressee ordered listing of emails), the enhanced email program/service of the present invention at block 302 attempts to select a "next" listed email. If the operation is unsuccessful ("yes" branch of block 304), as it will be the case eventually after all listed emails have been processed, the process terminates. If the operation is successful ("no" branch of block 304), the process continues at block 306. Note that which listed email constitutes the "next" listed email to be processed is dependent on where processing of the listed emails starts, which need not be the email where the addressee of interest is selected. The processing may start from any arbitrary one of the listed emails.

At block 306, the enhanced email program/service determines if the primary addressee of listed email being analyzed is the same as the addressee of interest (selected among the listed primary addressees). If the result of the determination is affirmative, processing returns to block 302. If the result of the determination is negative, the enhanced email program/service further determines whether the addressee of interest (selected among the listed primary addressees) is a secondary or member addressee of the email being analyzed, block 308. In one embodiment, the enhanced email program/service makes the "secondary addressee" determination by examining the other addressees in the secondary addressing positions. In one embodiment, the examination includes the secondary addressing positions in the "cc" list, the "bcc" list (if applicable) as well as the "To" list. In one embodiment, the enhanced email program/service makes the "member addressee" determination by accessing addressee books accessible to the user to determine if any of the addressees of the email being examined, primary or non-primary, is a group addressee; and if it is, whether the addressee of interest is a member of the group addressee.

For the illustrated embodiment, if there is no address book, or the accessed address books do not resolve an addressee of the email being examined as a group addressee, the addressee is assumed to be an individual addressee. Further, for the illustrated embodiment, if an addressee of the email being examined is resolved to be a group addressee, the enhanced email program/service makes only one pass in determining whether the addressee of interest is a member addressee. That is, the enhanced email program/service assumes all member addressees of a group addressee are individual addressees, and there are no group addressees contained with a group addressee requiring recursive processing. However, in an alternate embodiment, one or more predetermined iterations of recursive processing may be performed.

If it is determined at block 308 that the addressee of interest (selected among the listed primary addressees) is an addressee of the email being examined, e.g. a secondary or a member addressee, the enhanced email program/service creates and orderly inserts a "duplicate" of the listing entry into the listing for the email examined, block 310. If it is determined at block 308 that the addressee of interest (selected among the listed primary addressees) is not an addressee of the email examined, secondary or member of group addressee, processing returns to block 302.

As alluded to earlier, eventually after all listed emails have been processed, the attempted select operation of block 302 results in no email being returned. At such time, the process terminates.

Second Embodiment

Figure 4A:
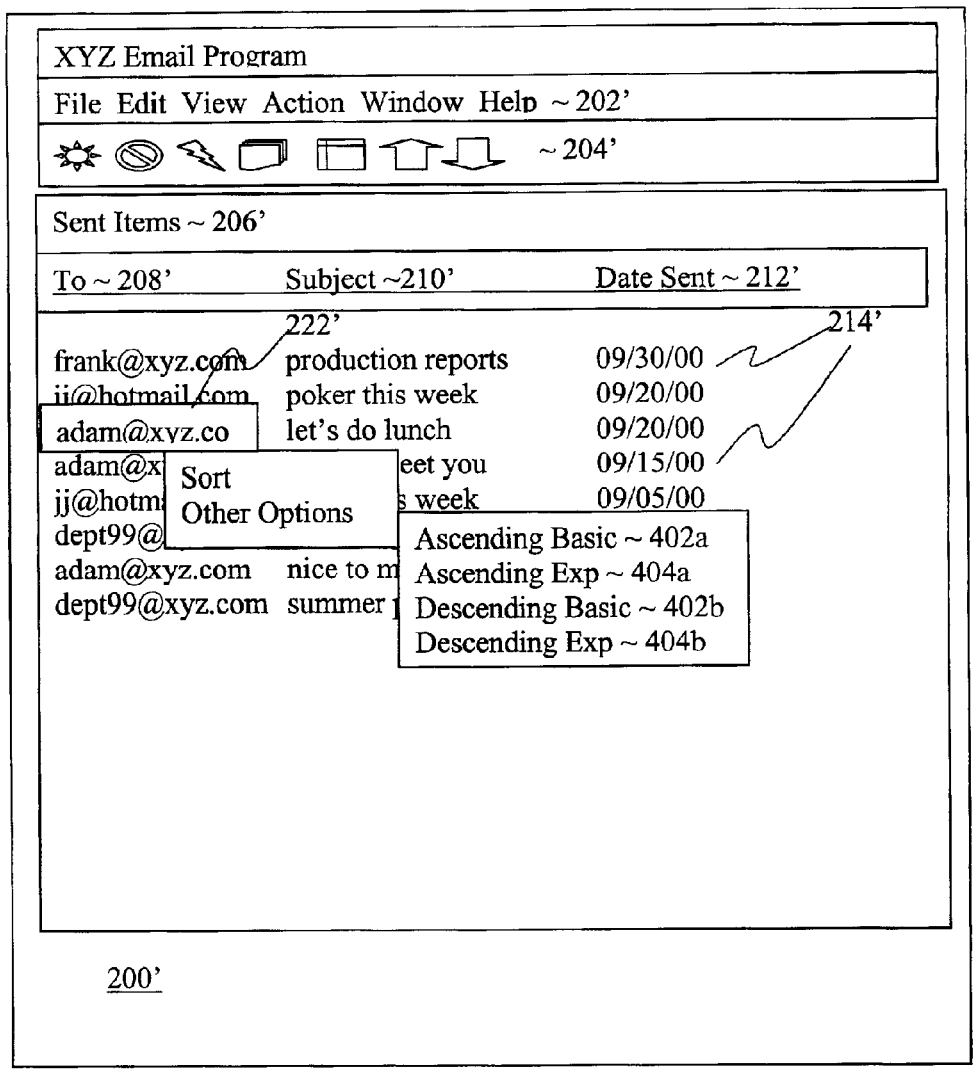
FIGS. 4a–4b illustrate an user interface view of the expanded addressee sort/listing function of the present invention, in accordance with another embodiment.
Figure 4B:
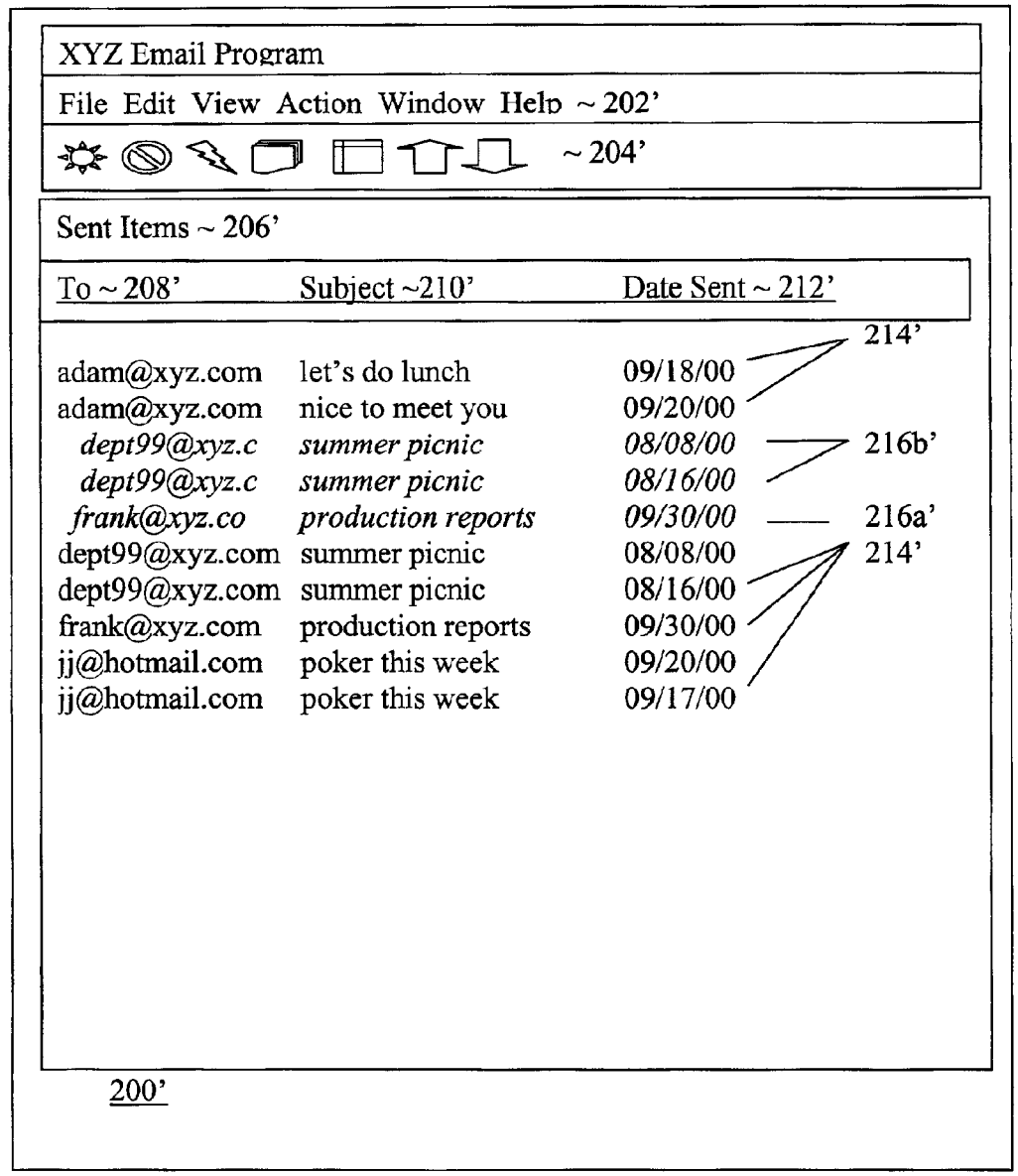

Referring now to FIGS. 4*a*–4*b*, wherein two block diagrams illustrating an end user interface view of the expanded addressee sort/listing function of the enhanced email program/service of the present invention, in accordance with another embodiment, are shown. Under this embodiment, a user may easily request a listing of emails (ordered by one or more non-addressee criteria) to be reordered by addressee, with the listing entries for an addressee of interest (selected among the listed primary addressees) expanded at the same time.

As illustrated in FIG. 4*a*, similar to the earlier described embodiment, example end user interface 200' of the enhanced email program/service of the present invention includes menu 202' of "drop down" commands, i.e. "File", "Edit" and so forth, and menu 204' of action icons. Further, example end user interface 200' includes sent item view 206' (i.e. a "folder content" view of the sent emails) having "To" column 208', "Subject" column 210', and "Date Sent" column 212', listing sent emails 214'. For the example illustration, emails 214' are ordered by one or more non-addressee criteria, e.g. by "Date Sent" 212'.

In accordance with this embodiment of the present invention, the enhanced email program/service further includes enhancements that facilitate a user in selecting an addressee of interest among the listed primary addressees (e.g. adam "at" xyz.com) 222' of the non-addressee ordered listing of emails 214', and requesting the listing of emails be re-ordered by addressee, as well as having the listing entries of the addressee of interest (selected among the primary addressees) be expanded, 404*a* or 404*b*. More specifically, the listing entries of the addressee of interest (selected among the listed primary addressee) are to be expanded to include listing entries for emails where the addressee of interest is a secondary or a member addressee.

In response, the enhanced email program/service of the present invention reorders the non-addressee ordered listing of entries, and expands the listing entries of emails 214' accordingly, supplementing the listing entries for the addressee of interest (selected among the listed primary addressees, e.g. "adam") with listing entries of emails where the addressee of interest is a secondary addressee (e.g. listing entry 216a') or a member addressee (e.g. listing entries 216b').

As the earlier described first embodiment, listing entry 216a' represents an added listing entry for an email addressed to another party ("frank") as the primary addressee, with "adam", the addressee of interest (selected among the listed primary addressees) addressed as a secondary addressee. Listing entries 216b' represent added listing entries for emails addressed to a group addressee ("dept99") as the primary addressee, with "adam", the addressee of interest (selected among the listed primary addressees) implicitly addressed as a member addressee.

Similarly, selection of an addressee of interest among the listed primary addressees of the ordered listing entries 214' is facilitated by supporting a user in clicking on a primary addressee of one of the displayed listing entries 214', using e.g. a cursor control device. The request to simultaneously re-order the listing by addressee and expand the listing entries of the addressee of interest (selected among the listed primary addressees) is facilitated by displaying the request (e.g. "sort ascending expanded" 404a of FIG. 4a), among a list of request/command options 402a–402b and 404a–404b, in response to a user "right clicking", after having selected the primary addressee, using e.g. a cursor control device. Such facilitation is also known in the art, and will not be further described.

Further, the supplemental listing entries are inserted directly below the supplemented listing entries of the addressee of interest. Additionally, the supplemental listing entries may be visually distinguished by techniques such as indentation, italicizing, and so forth.

Thus, it can be seen, the re-ordering and expansion of a listing to include listing entries identifying emails where an addressee of interest (selected among listed primary addressees) is addressed as a secondary or a member addressee may be easily provided for the user, through a few mouse clicks (or equivalent key strokes). Accordingly, under the present invention, it is much easier (as compared to the prior art) for a user to order, locate or identify an email addressed to an addressee of interest, independent of the addressing position or the manner the addressee of interest is addressed, as all emails of the addressee of interest (within the "current" view, such as illustrated "sent" view 206' of FIGS. 4a–4b) may be quickly listed for the user.

Figure 5:
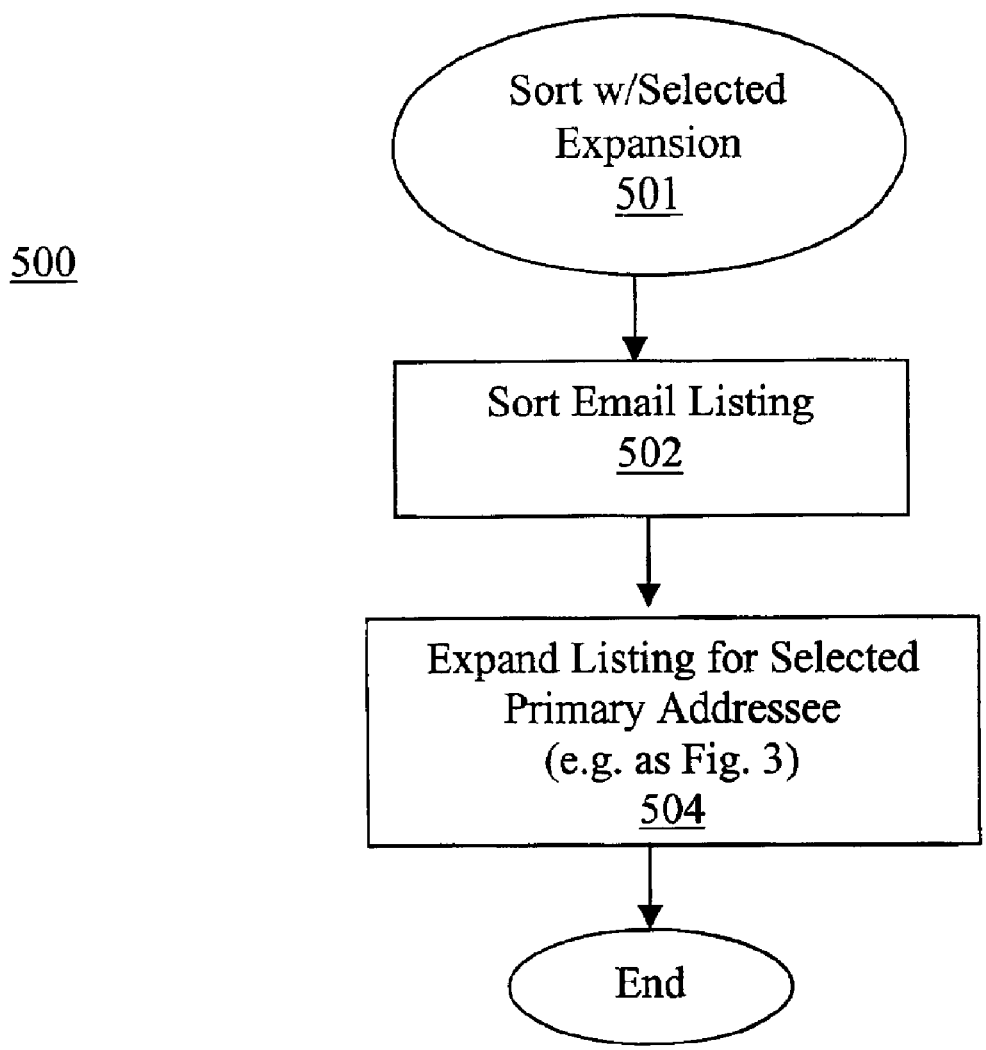
FIG. 5 illustrates the operational flow of the relevant aspects of the enhanced email program/service of the present invention of the embodiment of FIGS. 4a–4b.

FIG. 5 illustrates operational flow 500 of the relevant aspects of the enhancements made to the email program/service of the present invention for the embodiment of FIGS. 4a–4b. As illustrated, in response to the receipt of a request 501 to re-order a non-addressee ordered listing of emails, and supplement the email listing entries of an addressee of interest (selected among the listed primary addressee of the ordered listing of emails), the enhanced email program/service of the present invention at block 502 first re-orders the non-addressee ordered listing. The re-ordering may be performed using any one of a number of sorting/ordering techniques known in the prior art. Thereafter, the enhanced email program/service of the present invention at block 504 performs the operations earlier described referencing FIG. 3 to supplement the listing entries for the addressee of interest (selected among the listed primary addressees) with listing entries of the emails where the addressee of interest is addressed as a secondary or a member addressee, as described earlier.

Third Embodiment

Figure 6A:
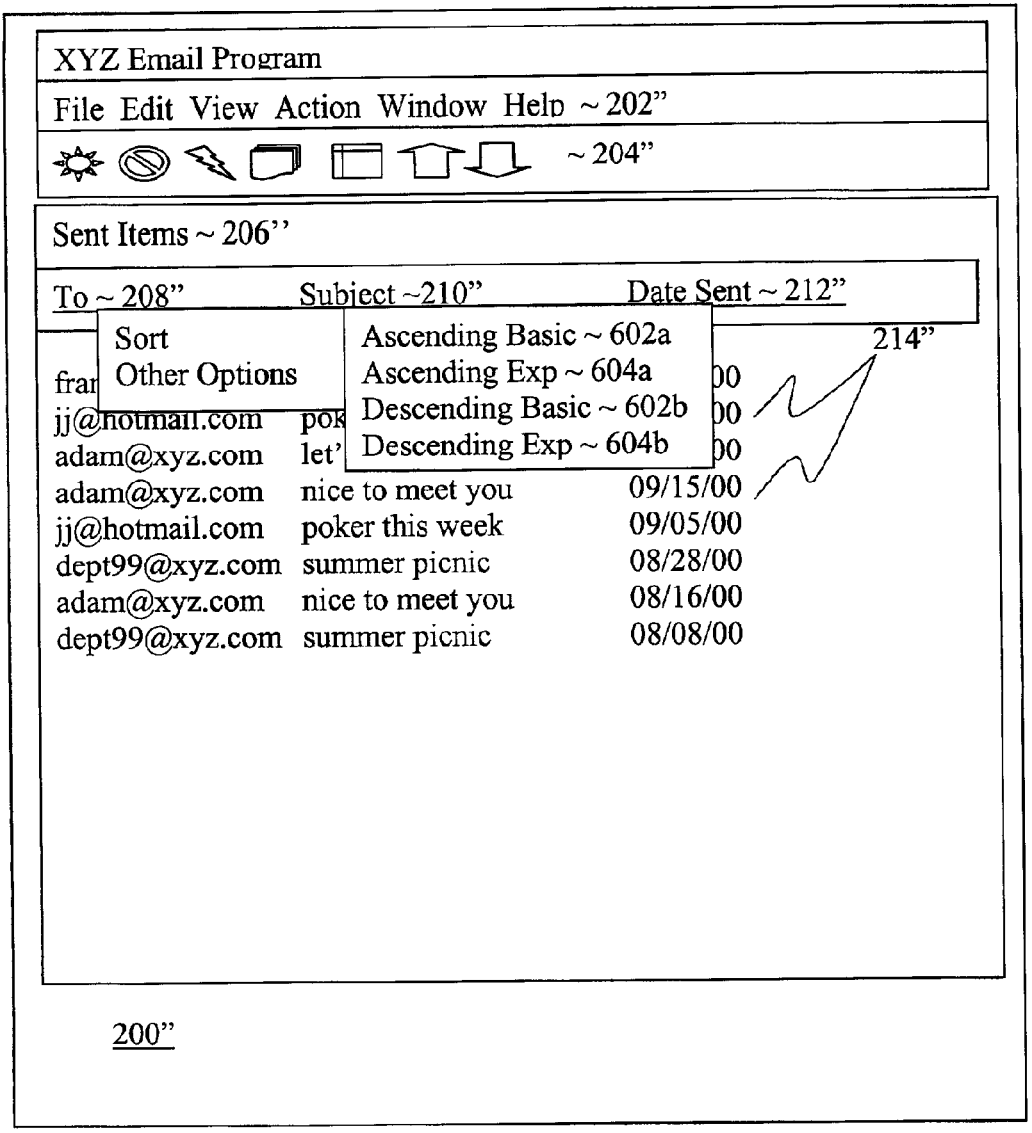
FIGS. 6a–6c illustrate an user interface view of the expanded addressee sort/listing function of the present invention, in accordance with yet another embodiment.
Figure 6B:
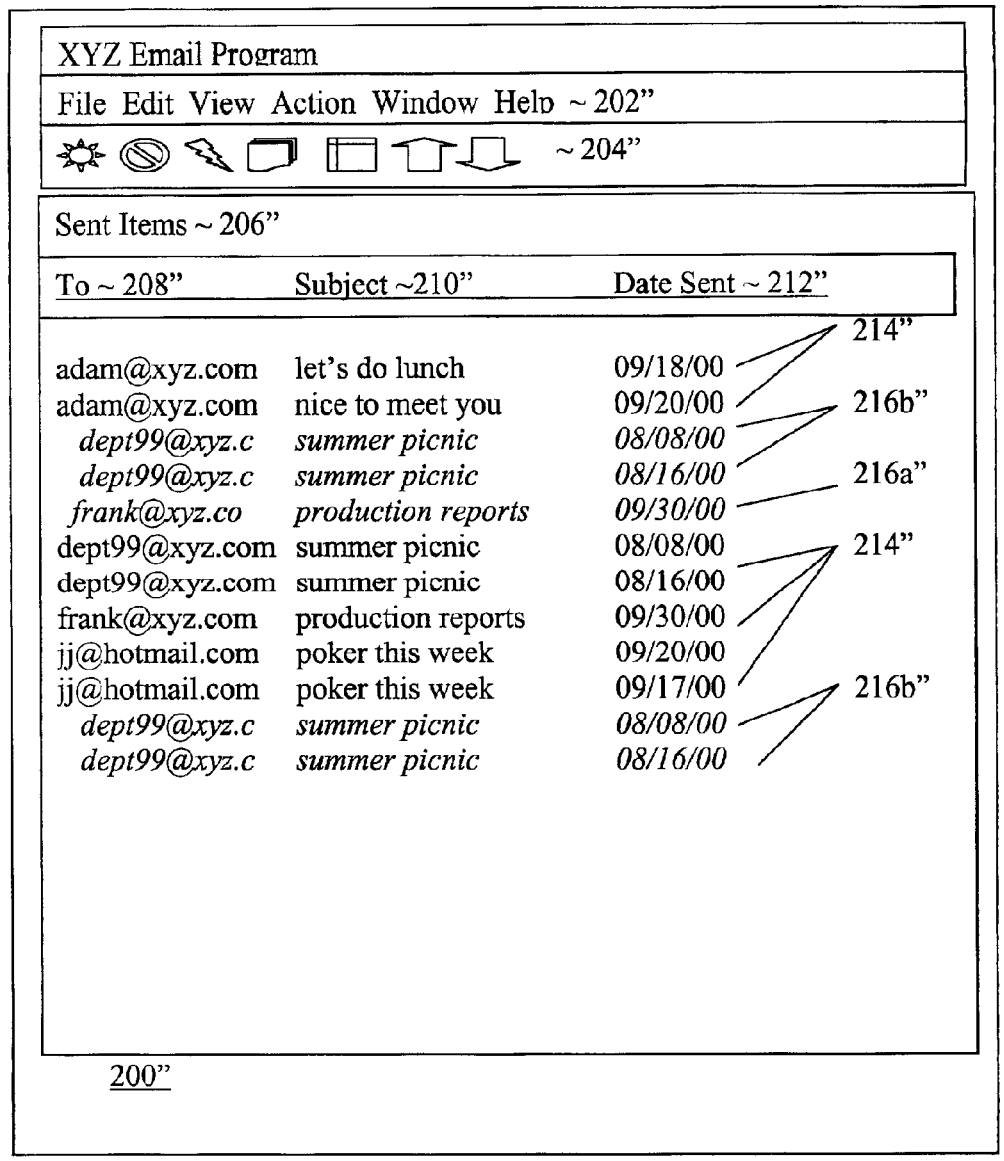

Referring now to FIGS. 6a–6b, wherein two block diagrams illustrating an end user interface view of the expanded addressee sort/listing function of the enhanced email program/service of the present invention, in accordance with yet another embodiment, are shown. Under this embodiment, a user may easily request a listing of emails to be re-ordered by addressee and expanded for all primary addressees, as described earlier for an addressee of interest selected among the listed primary addressee of interest. In other words, all listed primary addressees are considered addressees of interest.

As illustrated in FIG. 6a, similar to the earlier described embodiments, example end user interface 200" of the enhanced email program/service of the present invention includes menu 202" of "drop down" commands, i.e. "File", "Edit" and so forth, and menu 204" of action icons. Further, example end user interface 200" includes sent item view 206" (i.e. a "folder content" view of the sent emails) having "To" column 208", "Subject" column 210", and "Date Sent" column 212", listing sent emails 114. For the example illustration, emails 114 are ordered based on the content of a listing field other than the addressee field, i.e. the "To" column 212".

In accordance with this embodiment of the present invention, the enhanced email program/service further includes enhancements 604a or 604b that facilitate a user in requesting the non-addressee ordered listing of emails be re-ordered by addressee as well as having the listing expanded for all primary addressees (addressees of interest). More specifically, the listing entries for each primary addressee (addressee of interest) are to be expanded to include listing entries for emails where the addressee of interest is also a secondary or a member addressee of these emails.

In response, the enhanced email program/service of the present invention expands the listing entries 214" accordingly, re-ordering the listing entries 214" by addressee, if necessary. For each primary addressee (addressee of interest), the enhanced email program/service adds to the listing entries 214", additional listing entries where the addressee of interest is either a secondary or a member addressee (216a" and 216b").

As the earlier described first and second embodiments, listing entry 216a" represents an added listing entry where an addressee of interest (e.g. primary addressee "adam") is addressed as a secondary addressee (not shown). The primary addressee of this email is exemplary primary addressee "frank". Listing entries 216b" represent added listing entries where an addressee of interest (e.g. primary addressee "adam" or "jj") is addressed as a member addressee (not explicitly shown). The primary addressee of this email is exemplary group addressee "dept99".

Similar to the earlier described embodiments, the request to re-order and expand the listing entries is facilitated by displaying the request, e.g. "sort ascending expanded" 604a, among a list of request/command options 602a–602b and 604a–604b, in response to a user "right clicking", after having selected the addressee field, i.e. "To" column 208", using e.g. a cursor control device. Such facilitation is also known in the art, and will not be further described.

Further, the supplemental listing entries are inserted directly below the supplemented listing entries of the addressee of interest. Additionally, the supplemental listing entries may be visually distinguished by techniques such as indentation, italicizing, and so forth.

Thus, it can be seen, the re-ordering and expansion of a listing to include listing entries identifying emails for all primary addressees (addressees of interest) where the addressees of interest are addressed as secondary or member addressees may be easily provided for the user, through a few mouse clicks (or equivalent key strokes). Accordingly, under the present invention, it is much easier (as compared to the prior art) for a user to order, locate or identify an email addressed to an addressee of interest, independent of the addressing position or the manner the addressee of interest is addressed, as all emails of the addressee of interest (within the "current" view, such as illustrated "sent" view 206" of FIGS. 6*a*–6*b*) may be quickly listed for the user.

Figure 7A:
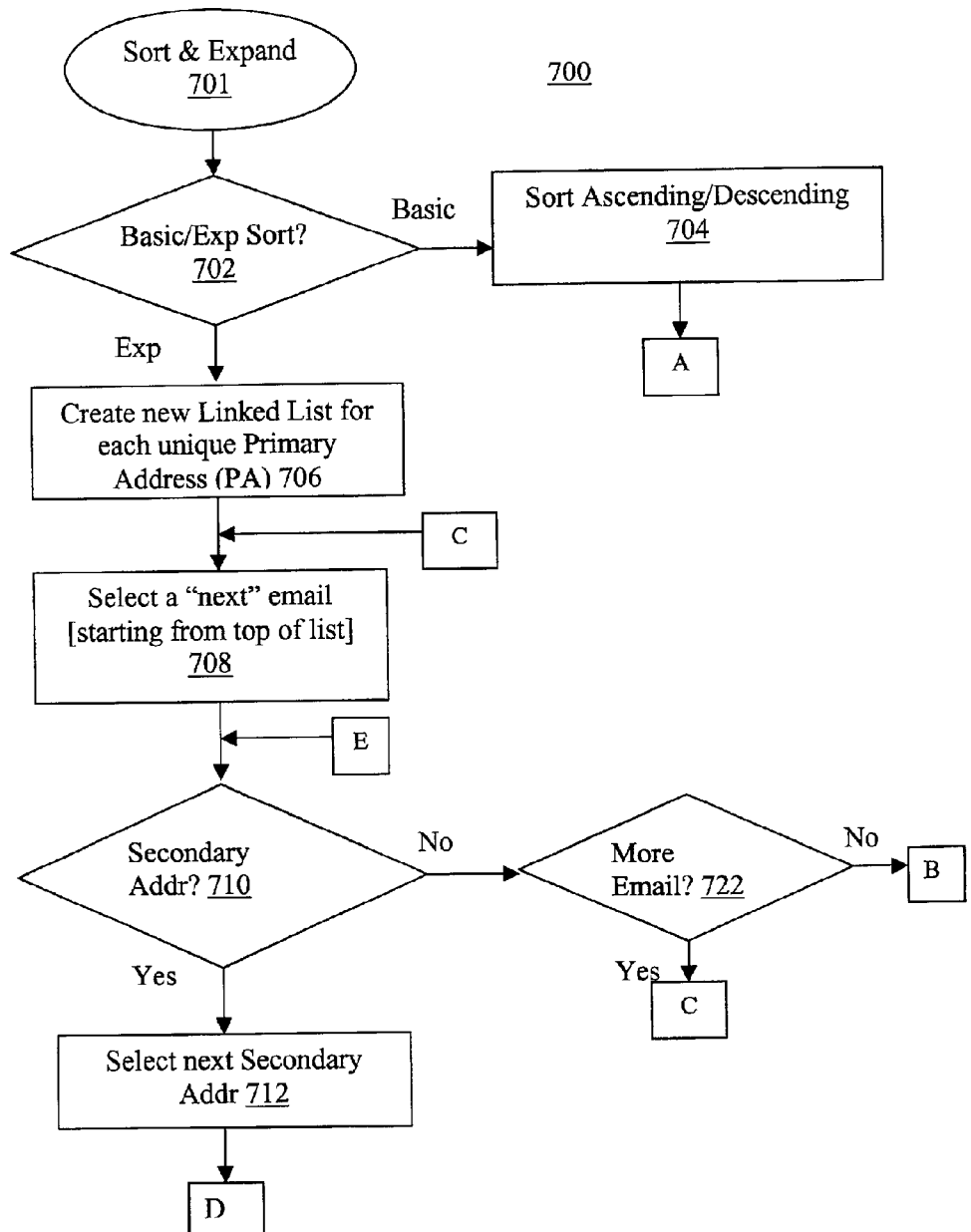
FIGS. 7a–7b illustrate the operational flow of the relevant aspects of the enhanced email program/service of the present invention of the embodiment of FIGS. 6a–6b.
Figure 7B:
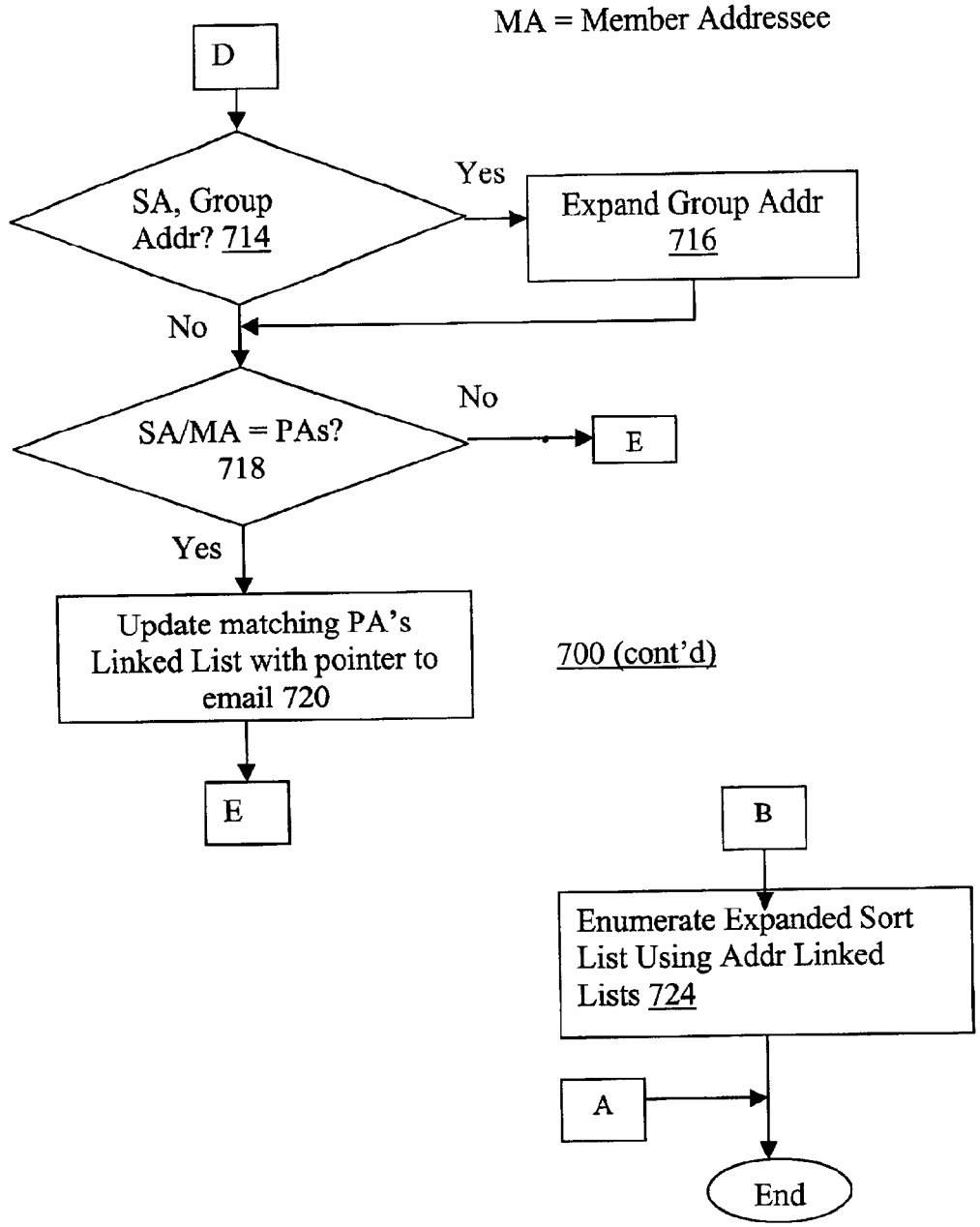

FIGS. 7*a*–7*b* illustrate operational flow 700 of the relevant aspects of the enhancements made to the email program/service of the present invention for the embodiment of FIGS. 6*a*–6*b*. As illustrated, in response to the receipt of a request 701 to re-order a listing of emails, the enhanced email program/service first determines whether the re-order request is to be performed with or without expansion (for all primary addressees), block 702. If the re-order operation is to be performed without expansion, the requested operation is a basic sort operation. The enhanced email program/service performs the requested re-order (without expansion) operation accordingly, block 704. The operation may be performed in accordance with any one of a number of sort/order techniques known in the art.

Figure 8:
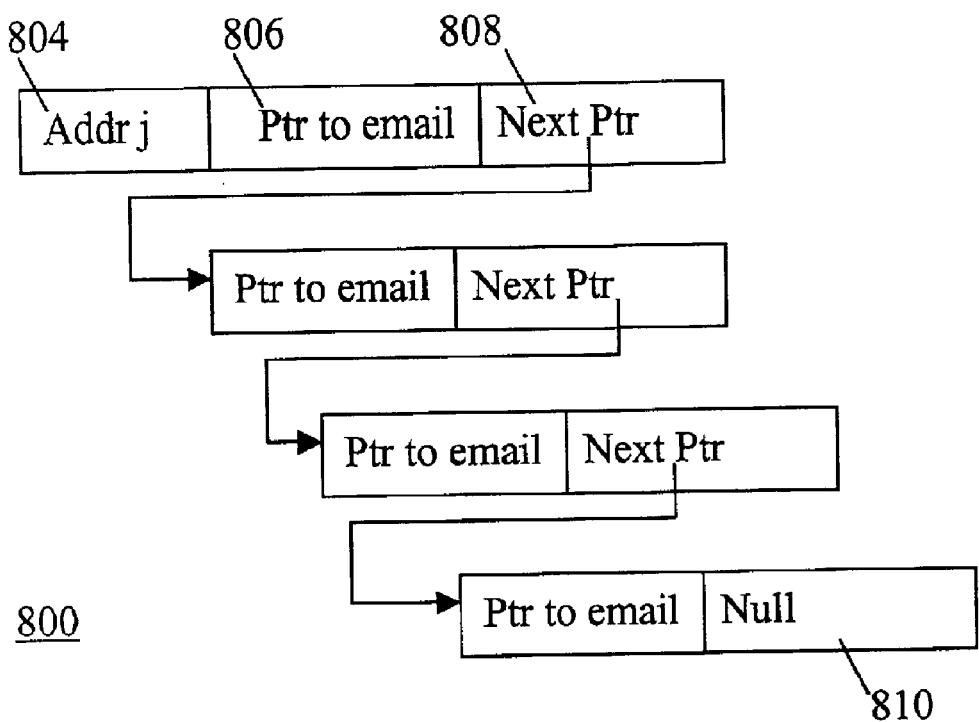
FIG. 8 illustrates an example data organization suitable for use to track an expanded list of emails of an addressee to practice the present invention, in accordance with one embodiment.

However, if at block 702, the requested re-order operation is to be performed with expansion (for all primary addressees), the enhanced email program/service makes a first pass through listed entries 214, creating a working linked list for each unique primary addressee (addressee of interest), block 706. For the illustrated embodiment, the working linked lists for the unique primary addressees are created and maintained in an ordered manner, i.e. ascending or descending, depending on the expanded re-order request. In other words, for an expanded ascending re-order request, the working linked list for unique primary addressee "frank" will be created and maintained logically after the working linked list for unique primary addressee "adam". An exemplary linked list data structure suitable for use as a working link list is illustrated in FIG. 8. Exemplary linked list 800 reflects a number of data 806 (pointers to emails) having been logically linked together using record pointers 808. As those skilled in the art would appreciate, at its initial creation, linked list 800 basically includes unique primary address 804 and terminating null pointer 810. Linked lists are known in the art, and will not be further described. In alternate embodiments, other data structures may also be used instead.

Continuing with FIG. 7*a*, having created the working linked lists for the unique primary addressees, the enhanced email program/service selects and analyzes the emails one at time. For the illustrated embodiment, the program/service selects a "next" email for analysis, block 708, starting at the top of the list, and works towards the bottom of the list. In alternate embodiments, the processing may start from the bottom of the list and work towards the top of the list. In yet other embodiments, the processing may start from an arbitrary point of the list and work towards either the top or the bottom of the list, and "wraps" around.

At block 710, the program/service determines if the email being analyzed has other secondary addressees. If yes, the program/service selects and analyzes the next secondary addressee, block 712. At block 714, the program/service determines if the secondary addressee being analyzed is a group addressee. If so, the group addressee is expanded with its member addressees identified, block 716. Upon either determining that the secondary addressee is not a group addressee or upon expanding the group addressee, the program/service further determines if the secondary addressee or any of the member addressees matches any of the unique primary addressees, block 718.

If the secondary addressee or one or more of the member addressees are determined to match one or more of the unique primary addressees, the corresponding linked lists of the matching primary addressees are updated to include pointers pointing to the email being analyzed, thereby logically associating the matching primary addressees to the email being analyzed, block 720.

Upon determining that neither the secondary addressee nor any one of the member addressees matches any of the primary addressees, or upon updating the applicable linked lists of the matching primary addressees, the program/service continues the process at block 710, determining whether the email being analyzed has additional secondary addressees remain to be processed. Eventually, upon processing all secondary addressees of the email being analyzed, the determination performed at block 710 results in a negative conclusion. Thereafter, the process continues at block 722 where the program/service determines if there are more emails to analyze, block 722. If there are more emails to analyze, the process continues back at block 708, otherwise the process continues at block 724, where the program/service enumerates the expanded listing, using the working linked lists to identify the supplemental email listing entries of the various unique primary addressees.

Accordingly, a listing of emails may be re-ordered and expanded at the same time (for all primary addressees). More importantly, the re-ordering and expansion may be requested by a user with a few mouse clicks (or equivalent key strokes), thereby allowing the user to be able to easily re-order a listing of emails (within a view) by addressee, and locate a email (within the view) addressed to an addressee, independent of the addressing position and/or manner the addressee is addressed.

Figure 6C:
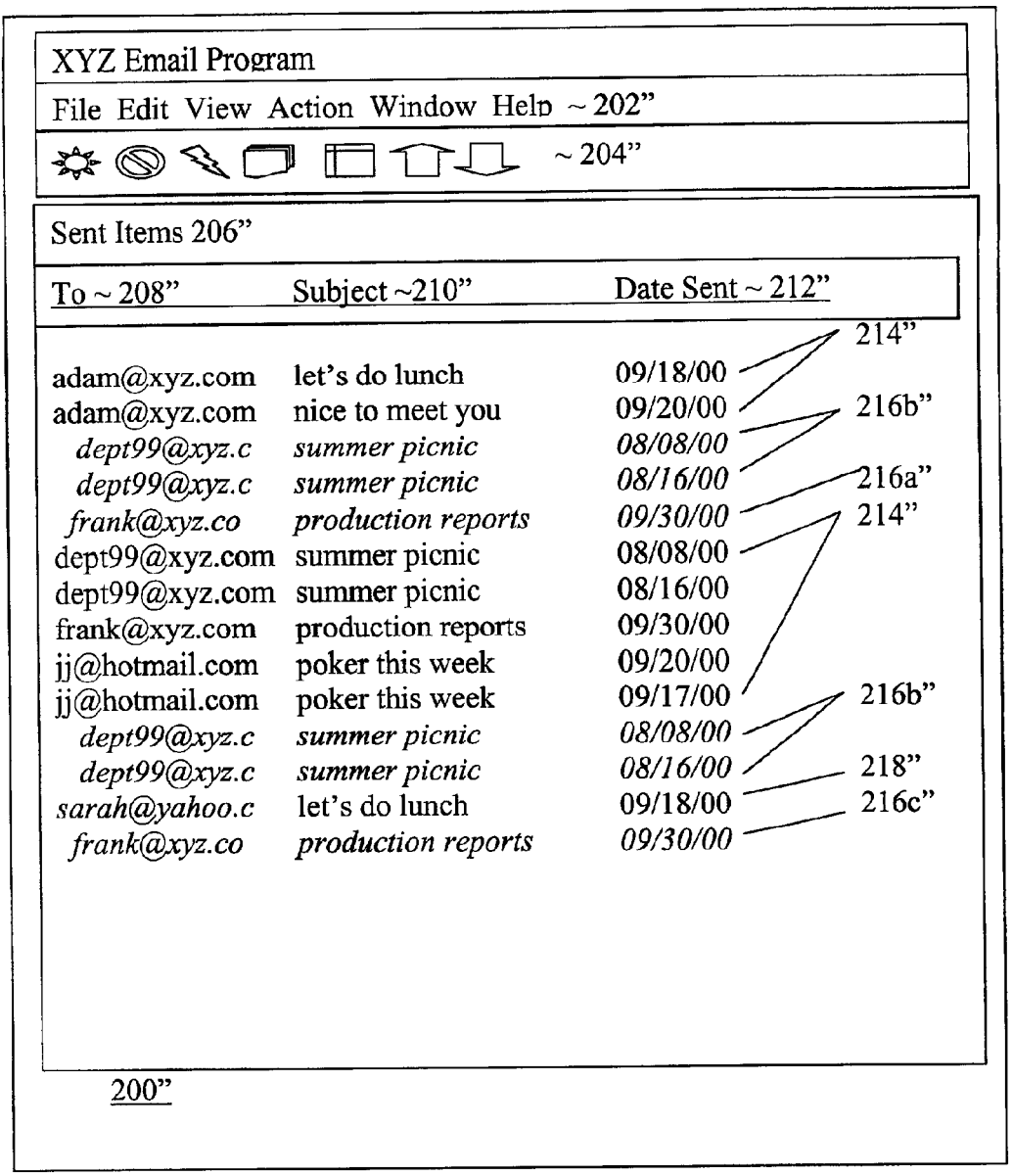

In alternate embodiments, the expansion may be further expanded, including treating each unique addressee as an addressee of interest, regardless of whether the unique addressee is a primary, a secondary or a member addressee, thereby not limiting the supplemental listing entry expansion to the primary addressees only. For unique addressees of interest that are addressed as secondary or member addressee only (such as addressee "sarah" of FIG. 6*c*), a pseudo primary addressee listing entry (218" of FIG. 6*c*) is created for each instance where one of such unique addressees is only so addressed. For the illustrated embodiment, the pseudo primary addressee listing entry (218" of FIG. 6*c*) is created with the unique addressee of interest relocated or instantiated as the primary addressee. Further, the fact that the primary addressee is a "relocated" secondary addressee or an "instantiated" member addressee is visually distinguished by techniques such as italicizing, highlighting and so forth. Once created, the pseudo primary addressee listing entry (218" of FIG. 6*c*) may be processed in the earlier described process 700 as other primary addressee listing entries (214" of FIG. 6*c*), having other email listing entries where the pseudo primary addressee (addressee of interest) is addressed as either a secondary or member addressee duplicated (216*c*" of FIG. 6*c*) and associated with the pseudo primary addressee listing entry (218" of FIG. 6*c*).

Example Computer System

Figure 9:
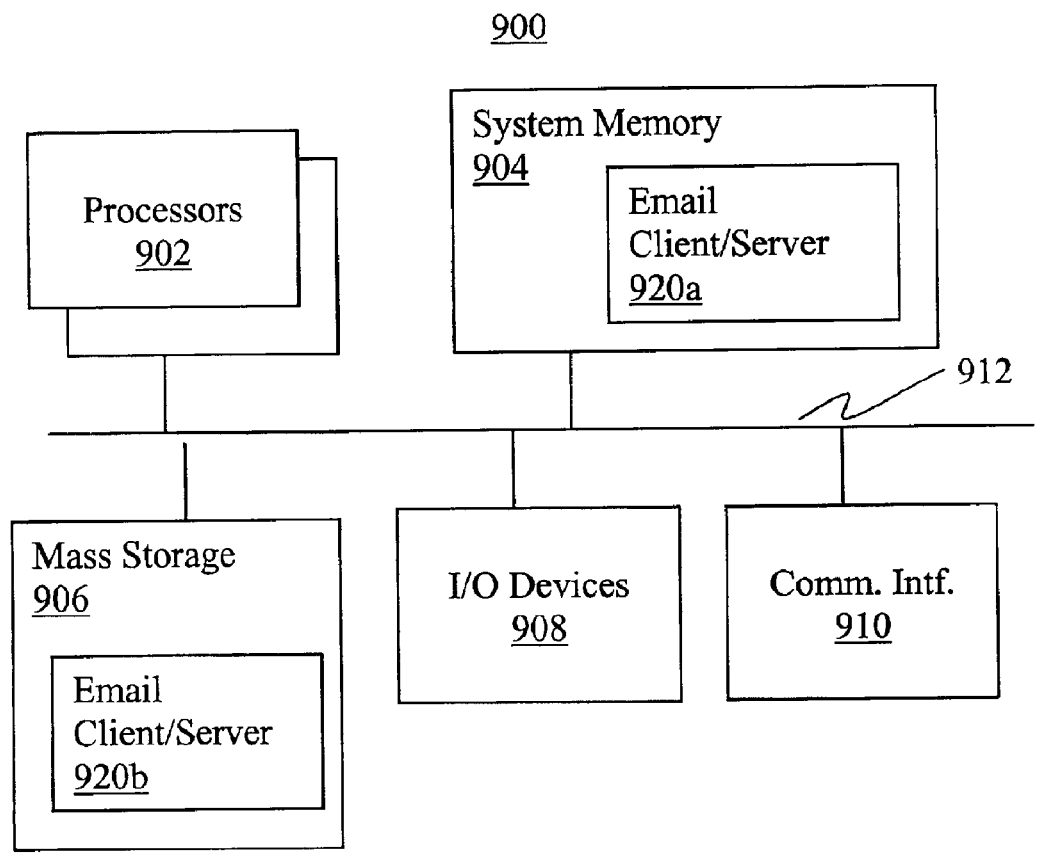
FIG. 9 illustrates an example computer system suitable for use to practice the present invention, in accordance with one embodiment.

FIG. 9 illustrates an example computer system suitable for use to practice the present invention, in accordance with one embodiment. Example computer system 900 may be used for practicing either the client or the server portion of a client/server implementation of the enhanced email program/service of the present invention. As shown, computer system 900 includes one or more processors 902 and system memory 904. Additionally, computer system 900 includes mass storage devices 906 (such as diskette, hard drive, CDROM and so forth), input/output devices 908 (such as keyboard, cursor control and so forth) and communication interfaces 010 (such as network interface cards, modems and so forth). The elements are coupled to each other via system bus 912, which represents one or more buses. In the case of multiple buses, they are bridged by one or more bus bridges (not shown). Each of these elements performs its conventional functions known in the art. In particular, system memory 904 and mass storage 906 are employed to store a working copy and a permanent copy of the programming instructions implementing the client/server portion of the enhanced emailed program/service of the present invention. The permanent copy of the programming instructions may be loaded into mass storage 906 in the factory, or in the field, as described earlier, through a distribution medium (not shown) or through communication interface 910 (from a distribution server (not shown). The constitution of these elements 902-912 are known, and accordingly will not be further described.

Conclusion and Epilogue

Thus, it can be seen from the above descriptions, a method and apparatus for expanded addressee sort/listing for emails has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method comprising:
   displaying an addressee ordered listing of emails;
   facilitating selection of a primary addressee of said listed emails;
   facilitating submission of a request to expand said displayed addressee ordered listing of emails, and supplement said listed emails of said selected primary addressee with additional listing entries for emails also addressed to said selected primary addressee as a secondary or member addressee; and
   in response, expanding said displayed addressee ordered listing of emails, supplementing said listed emails of said selected primary addressee with additional listing entries for emails also addressed to said selected primary addressee as a secondary or member addressee.

2. The method of claim 1, wherein said facilitating of submission of a request to expand said displayed addressee ordered listing comprises displaying an option to submit said request responsive a user action after the user having made said selection of a primary addressee from said displayed addressee ordered listing of emails, and facilitating selection of said displayed option.

3. The method of claim 1, wherein said expanding and supplementing comprises identifying which emails among said emails of said addressee ordered listing of emails are also addressed to said selected primary addressee as a secondary/member addressee, and orderly inserting an additional listing entry for each of said identified emails beneath the addressee ordered listing of emails addressed to said selected primary addressee as the primary addressee.

4. The method of claim 3, wherein said identifying comprises examining other addressees of emails of said addressee ordered listing of emails, where said selected primary addressee is not the primary addressee of the emails, and determining if said selected primary addressee is among the other addressees of the emails examined.

5. The method of claim 3, wherein said identifying comprises examining primary addressees of emails of said addressee ordered listing of emails, where said selected primary addressee is not the primary addressee, determining if any of these other primary addressees are group addressees, and for each determined group addressee, determining if said selected primary addressee is a member of the group addressee.

6. The method of claim 1, wherein said emails are sent emails.

7. A method comprising:
   displaying a listing of emails ordered by one or more non-addressee criteria;
   facilitating selection of a primary addressee of said listed emails;
   facilitating submission of a request to re-order said displayed listing of emails by the emails' addressees, and expanding said addressee re-ordered listing of emails to include additional listing entries for emails addressed to said selected primary addressee as a secondary or member addressee; and
   in response, re-ordering said displayed listing of emails by addressees of the emails, and expanding the addressee re-ordered listing to include additional listing entries for emails also addressed to said selected primary addressee as a secondary or member addressee.

8. The method of claim 7, wherein said facilitating of submission of a request to re-order and expand said displayed listing comprises displaying an option to submit said request in response to a user action after the user having made said selection of a primary addressee from said non-addressee ordered listing of emails, and facilitating selection of said displayed option.

9. The method of claim 7, wherein said re-ordering and expansion comprises identifying which emails among said emails of said addressee re-ordered listing of emails are also addressed to said selected primary addressee as a secondary/member addressee, and inserting into said addressee re-ordered listing of emails an additional listing entry for each of said identified emails.

10. The method of claim 9, wherein said identifying comprises examining other addressees of emails of said addressee re-ordered listing of emails, where said selected primary addressee is not the primary addressee of the emails, and determining if said selected primary addressee is among the other addressees of the emails examined.

11. The method of claim 9, wherein said identifying comprises examining primary addressees of emails of said addressee re-ordered listing of emails, where said selected primary addressee is not the primary addressee, determining if any of these other primary addressees are group addressees, and for each determined group addressee, determining if said selected primary addressee is a member of the group addressee.

12. The method of claim 7, wherein said emails are sent emails.

13. A method comprising:
   displaying a listing of emails ordered by one or more non-addressee criteria;
   facilitating submission of a request to re-order said displayed listing of emails by addressee of the emails in an expansive manner, including additional listing entries for emails also addressed to primary addressees as secondary or member addressees; and
   in response, re-ordering said displayed listing of emails by the emails' addressees in said expansive manner, including additional listing entries for emails also addressed to primary addressees as secondary or member addressees.

14. The method of claim 13, wherein said facilitating of submission of a request to re-ordered said displayed listing of emails by the emails' addressees in an expansive manner comprises displaying an option to submit said request in response to a user action, and facilitating selection of said displayed option.

15. The method of claim 13, wherein said re-ordering comprises identifying for each primary addressee, which emails among said emails of said listing of emails the primary addressee is also addressed as a secondary or member addressee, and causing a listing entry for each of said identified emails to be additionally included in the expansive addressee ordered listing of emails.

16. The method of claim 15, wherein said identifying comprises examining for each primary addressee, other addressees of emails of said listing of emails where the primary addressee is not the primary addressee of the emails, and determining if the primary addressee is among the other addressees of the emails examined.

17. The method of claim 15, wherein said identifying comprises examining for each primary addressee, primary addressees of emails of said listing of emails where the primary addressee is not the primary addressee, determining if any of these other primary addressees are group addressees, and for each determined group addressee, determining if the primary addressee is a member of the group addressee.

18. The method of claim 13, wherein said emails are sent emails.

19. The method of claim 13, wherein the method further comprises initially expanding said listing of emails with one or more pseudo primary addressee listing entries, one each for each unique addressee addressed among said listing of entries as a secondary addressee or a member addressee only, and said reordering in the expansive manner is performed for the expanded listing of emails.

20. The method of claim 19, wherein the creation of each pseudo primary addressee listing entry comprises either relocating or instantiating the unique addressee as the primary addressee of the pseudo primary addressee listing entry.

21. An apparatus comprising:
   a storage medium having stored therein a plurality of programming instructions designed to enable said apparatus to
      display an addressee ordered listing of emails,
      facilitate selection of a primary addressee of said listed emails,
      facilitate submission of a request to expand said displayed addressee ordered listing of emails, and supplement said listed emails of said selected primary addressee with listing entries for emails also addressed to said selected primary addressee as a secondary or member addressee, and
      in response, expand said displayed addressee ordered listing of emails, supplementing said listed emails of said selected primary addressee with additional listing entries for emails also addressed to said selected primary addressee as a secondary or member addressee; and
   a processor coupled to the storage medium to execute the programming instructions.

22. The apparatus of claim 21, wherein said programming instructions are designed to display an option for submitting said request in response to a user action after the user having made said selection of a primary addressee from said addressee ordered listing of emails, and facilitate selection of said displayed option.

23. The apparatus of claim 21, wherein said programming instructions are designed to identify which emails among said emails of said addressee ordered list of emails are also addressed to said selected primary addressee as a secondary/member addressee, and orderly insert a listing entry for each of said identified emails beneath the ordered list of emails addressed to said selected primary addressee as the primary addressee.

24. The apparatus of claim 23, wherein said programming instructions are designed to examine other addressees of emails of said addressee ordered listing of emails, where said selected primary addressee is not the primary addressee of the emails, and determine if said selected primary addressee is among the other addressees of the emails examined.

25. The apparatus of claim 23, wherein said programming instructions are designed to examine primary addressees of emails of said addressee ordered listing of emails, where said selected primary addressee is not the primary addressee, determine if any of these other primary addressees are group addressees, and for each determined group addressee, determine if said selected primary addressee is a member of the group addressee.

26. An apparatus comprising:
   a storage medium having stored therein a plurality of programming instructions designed to enable said apparatus to
      display a listing of emails ordered by one or more non-addressee criteria,
      facilitate selection of a primary addressee of said listed emails,
      facilitate submission of a request to re-order said displayed listing of emails by the emails' addressees, and to expand the listing of emails to include additional listing entries for emails also addressed to said selected primary addressee as a secondary or member addressee, and
      in response, re-order said displayed listing of emails by the emails' primary addressees, and include additional listing entries for emails also addressed to said selected primary addressee as a secondary or member addressee; and
   a processor coupled to the storage medium to execute the programming instructions.

27. The apparatus of claim 26, wherein said programming instructions are designed to display an option to submit said request in response to a user action after the user having made said selection of a primary addressee from said non-addressee ordered listing of emails, and facilitate selection of said displayed option.

28. The apparatus of claim 26, wherein said programming instructions are designed to identify which emails among said emails of said list of emails are also addressed to said selected primary addressee as a secondary/member addressee, and insert into said list of emails an additional listing entry for each of said identified emails.

29. The apparatus of claim 28, wherein said programming instructions are designed to examine other addressees of emails of said listing of emails, where said selected primary addressee is not the primary addressee of the emails, and determine if said selected primary addressee is among the other addressees of the emails examined.

30. The apparatus of claim 28, wherein said programming instructions are designed to examine primary addressees of emails of said listing of emails, where said selected primary addressee is not the primary addressee, determine if any of these other primary addressees are group addresses, and for each determined group addressee, determine if said selected primary addressee is a member of the group addressee.

31. An apparatus comprising:
a storage medium having stored therein a plurality of programming instructions designed to enable the apparatus to
display a listing of emails ordered by one or more non-addressee criteria,
facilitate submission of a request to re-order said displayed listing of emails in an expansive manner to include additionally listing entries for emails also addressed to primary addressees of said emails as secondary or member addressees, and
in response, re-order said displayed listing of emails by primary addressees of said emails in said expansive manner, including additional listing entries for emails also addressed to primary addressees of the emails as secondary or member addressees; and
a processor coupled to the storage medium to execute the programming instructions.

32. The apparatus of claim 31, wherein said programming instructions are designed to display an option to submit said request in response to a user action, and facilitate selection of said displayed option.

33. The apparatus of claim 31, wherein said programming instructions are designed to identify for each primary addressee, which emails among said emails of said listing of emails are also addressed to the primary addressee as a secondary/member addressee, and cause an additional listing entry for each of said identified emails to be inserted in said listing of emails.

34. The apparatus of claim 33, wherein said programming instructions are designed to examine for each primary addressee, other addressees of emails of said listing of emails where the primary addressee is not the primary addressee of the emails, and determine if the primary addressee is among the other addressees of the emails examined.

35. The apparatus of claim 33, wherein said programming instructions are designed to examine for each primary addressee, primary addressees of emails of said listing of emails where the primary addressee is not the primary addressee, determine if any of these other primary addressees are group addresses, and for each determined group addressee, determine if the primary addressee is a member of the group addressee.

36. The apparatus of claim 31, wherein the programming instructions are further designed to initially expand said listing of emails with one or more pseudo primary addressee listing entries, one each for each unique addressee addressed among said listing of entries as a secondary addressee or a member addressee only, and perform said re-ordering in the expansive manner for the expanded listing of emails.

37. The apparatus of claim 36, wherein the programming instructions are further designed to relocate or instantiate the unique addressee as the primary addressee of a pseudo primary addressee listing entry being created.

* * * * *

UNITED STATES PATENT AND TRADEMARK OFFICE
CERTIFICATE OF CORRECTION

PATENT NO. : 6,941,346 B2  Page 1 of 1
APPLICATION NO. : 09/796767
DATED : September 6, 2005
INVENTOR(S) : G. Eric Engstrom It is certified that error appears in the above-identified patent and that said Letters Patent is hereby corrected as shown below:

Column 3
Line 43, "...processor include microprocessors..." should read --... processor includes microprocessors...--.

Column 5
Line 37, "...as it will be the case..." should read --... as will be the case...--.

Column 6
Line 12, "...group addressees contained with a group addressee..." should read --...group addressees contained within a group addressee...--.

Column 8
Line 13, "...addressee of interest..." should read --...addressees of interest...--.

Column 10
Line 50, "...or member addressee only..." should read --...or member addressees only...--.

Column 11
Line 62, "...request responsive a user..." should read --...request responsive to a user...--.

Column 13
Line 15; "...request to re-ordered said..." should read --...request to re-order said...--.

Signed and Sealed this

Tenth Day of April, 2007

JON W. DUDAS
*Director of the United States Patent and Trademark Office*